3,105,554
DOWN HOLE TOOL
Richard H. McCall, New Iberia, La., assignor to Texaco Inc., New York, N.Y., a corporation of Delaware
Filed May 26, 1960, Ser. No. 31,935
4 Claims. (Cl. 166—169)

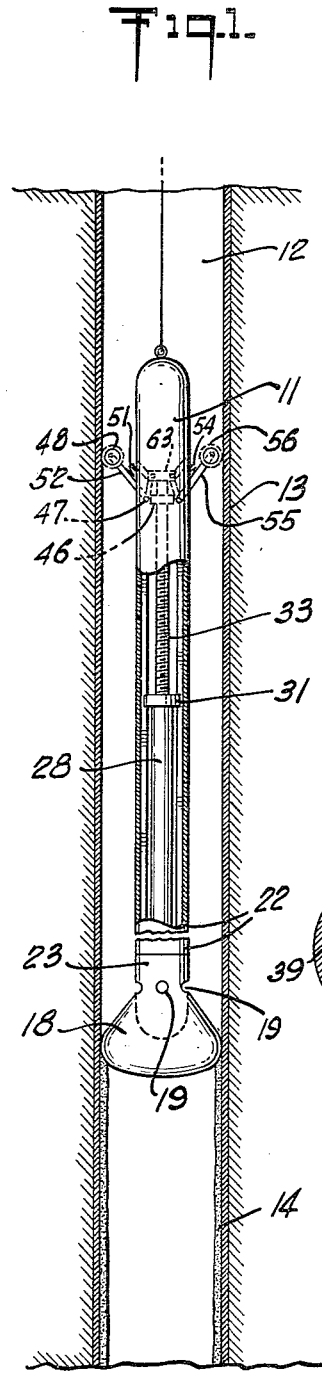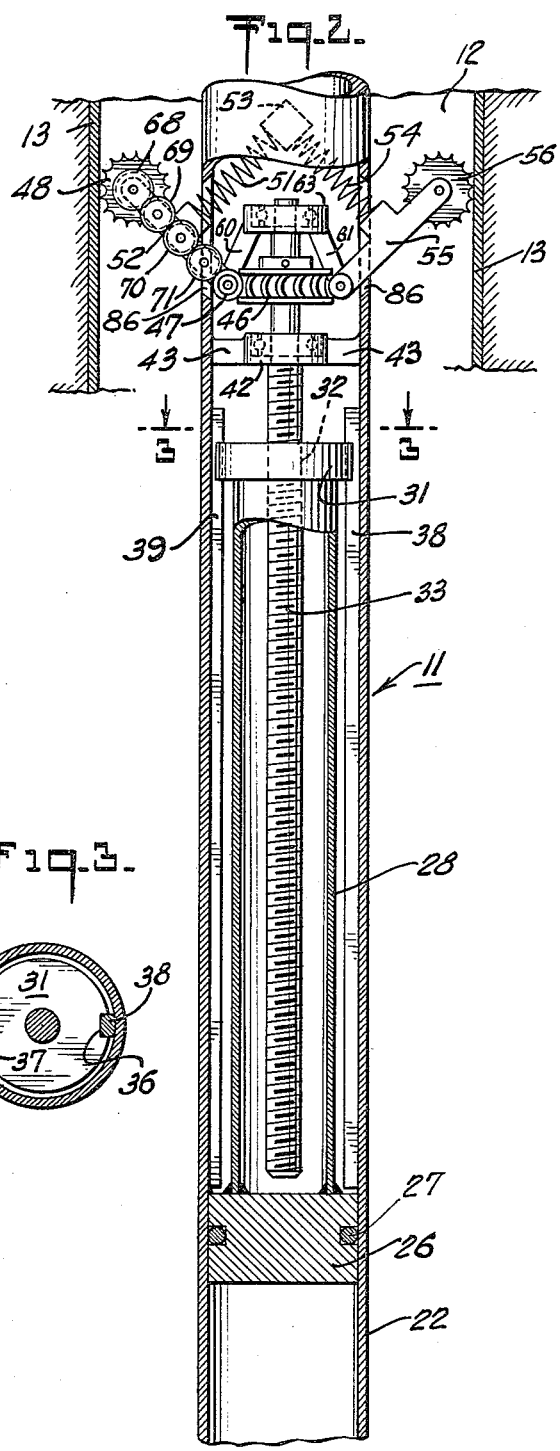

This invention concerns a down hole tool for oil well operations, in general. More specifically a tool according to this invention is particularly adapted for use in applying corrosion inhibiting materials to the inside walls of casing, or tubing in an oil well, or the like.

Heretofore there have been provided, or suggested, various tools for applying corrosion inhibiting coatings to the walls of a deep well; but such attempts have made use of materials in liquid form for coating the walls of the hole. Consequently, the inhibiting effects of any such coating has not been of lasting quality. In addition, the tools employed for carrying out coatings according to the prior suggestions have involved relatively costly structure in that the actuation control, for causing the inhibiting material to be placed on the tubing walls, has been controlled from the surface so that the connection to the tool has included relatively costly equipment which must be able to extend the full length down to the lowest portion of the hole that is to be coated.

Consequently, it is an object of this invention to provide a relatively simple, mechanically actuated tool for coating casing or tubing in a deep well with viscous material.

Another object of this invention is to provide a down hole tool for use in coating the interior walls of well casings or the like, with a semi-solid material having long lasting corrosion inhibiting effects.

Briefly, the invention may be described as a down hole tool for applying coating to the interior walls of casing and the like. It comprises a hollow cylindrical body for containing a viscous coating material, and has a piston in said body. The tool also comprises means for mechanically moving said piston within said body to eject said coating material. The said piston moving means is actuated by relative motion between said tool and said casing.

Again briefly, the invention may be described as a positive mechanical drive extrusion tool that is adapted for coating interior surfaces in deep well casings and the like. The tool comprises a hollow cylindrical body for containing a viscous coating material, and has a piston in said body for extruding said material. The tool also comprises mechanical drive means for moving said piston along said body in response to relative motion between said tool and said casing, and it comprises screw thread drive means for moving said piston along said body. The tool also comprises friction means including spiked wheel means contacting said casing for actuating said drive means due to relative movement between the said tool and said casing.

The foregoing and other objects and benefits of the invention will be set forth more fully below, and are described in greater detail in connection with the drawings, wherein:

FIGURE 1 is a schematic diagram partially in longitudinal section, showing the complete tool in place within a deep well, as it is employed in coating the interior surfaces thereof;

FIGURE 2 is an enlarged fragmentary longitudinal cross section view, showing the interior structural elements of the tool;

FIGURE 3 is a transverse cross section view taken along the lines 3—3 of FIGURE 2, looking in the direction of the arrows;

Figure 4:
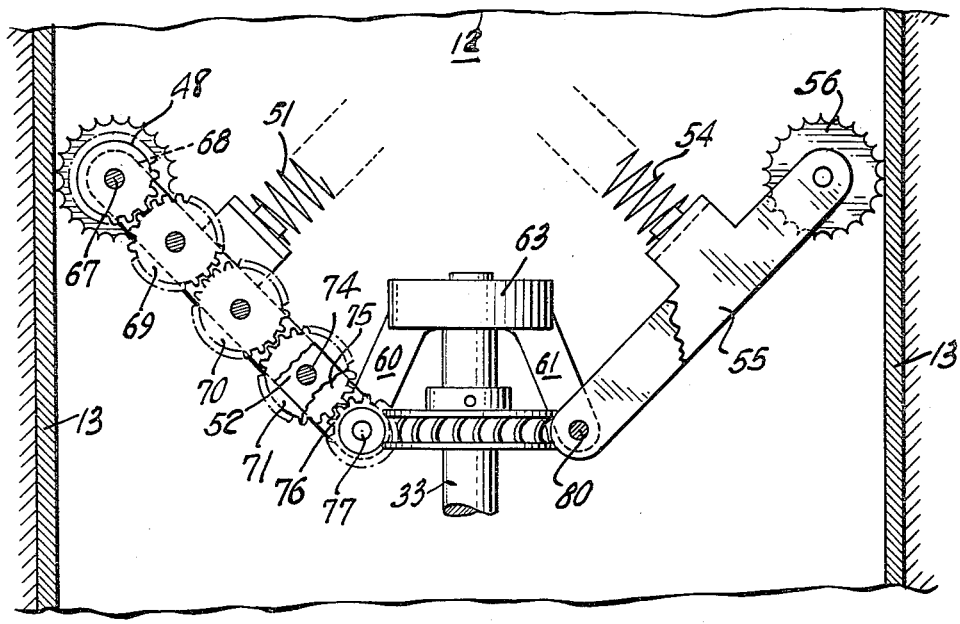
FIGURE 4 is a further enlarged detail showing of the gear train drive connecting the friction wheels to the piston drive mechanism of the tool.

Referring to FIGURE 1 it is pointed out that a tool 11 in accordance with the invention, is adapted for being lowered within a deep well, e.g. a well 12 illustrated that has a casing 13, or other tubing, therein. The tool 11 may be employed by lowering it within the well 12 to a desired depth, which is usually the bottom of the string of casing 13 that is to be protected. Then, as the tool is operated it causes an inhibiting material 14 to be extruded onto the inner walls of the casing 13. This takes place as the tool 11 is raised from such lowest level for a sufficient distance that the inhibiting material 14 is all exhausted from within the tool 11. Thereafter, the process is repeated beginning at a depth which insures continuation of the deposit of inhibiting material 14.

It will be appreciated that the casing 13 could be tubing or any conduit that it is desired to apply coating to.

It will be observed that at the bottom end (when in place in a well) of the tool 11, there is a resilient spreader 18, that may take any feasible shape. However, it is preferably in the form of an inverted conical skirt as illustrated. Furthermore, it has a sufficient maximum diameter to cause a spreading action over the interior wall surfaces of the casing 13. The inhibiting material 14 will be extruded from a plurality of holes 19 that are located just above the spreader 18 and are in communication with the interior of the tool 11 where the inhibiting material 14 is stored. Of course, other passageways might be employed instead of the holes 19 illustrated.

Referring to FIGURES 2-5, the mechanical elements and details of their structure, along with the interrelationship thereof, will be described. It is pointed out that at the lower portion of the tool 11 there is a hollow cylindrical body 22 that is adapted for storing a supply of the inhibiting material 14 therein. It may be noted that at the lower end of this body portion 22 there is a cap element 23 (see FIGURE 1) that is removably attached for making the interior of the body 22 readily available to load the inhibiting material.

There is a piston 26 that travels within the cylindrical body 22 and acts as the means for extruding the inhibiting material from the holes 19 and so onto the walls of the casing 13. Piston 26 may have a seal such as a piston ring 27 illustrated, for maintaining a tight seal between the piston and the interior surface of the cylindrical body 22.

The piston 26 may be mechanically driven along the length of the body 22 in various ways, but is preferably so moved by means of a thrust tube 28 that is attached in any feasible manner to the upper surface of the piston 26, e.g. by means of being welded thereto. Thrust tube 28 is in turn integrally attached to a travelling-nut disc 31 that has an internally threaded, centrally located hole 32 therethrough which cooperates with, and rides on the threaded portion of a drive shaft 33. In order to prevent the travelling-nut disc 31 from rotating, it has a pair of notches 36 and 37 (FIG. 3) that slide freely over a pair of tracks 38 and 39 respectively which are attached longitudinally along the inner surfaces of the upper portion of body 22 of the tool 11.

The drive shaft 33 is supported centrally within the tool 11 by means of a bearing 42 (FIG. 2) that is supported from the walls of the body 22 of the tool 11 in any appropriate manner, such as by web supports 43 illustrated. It will be noted that the bearing 42 must include a thrust bearing for supporting the drive shaft 33. The actual bearing structure is preferably an anti-friction type bearing, e.g. ball bearing, or the like.

Above the bearing 42, shaft 33 is not threaded but has securely attached thereto, for rotation therewith, a worm gear 46. In driving relation with gear 46 there is a worm 47 that is rotated by means of a gear train, as illustrated, which connects to a pair of spiked wheels 48 that contact the walls of the casing 13. This gear train is shown in more detail in FIGURES 4 and 5, but it will be understood that various alternative arrangements may be made for making a mechanical driving connection from a friction driving wheel, e.g. spiked wheel 48, to the driving connection for the piston drive shaft 33.

In order to maintain the proper friction for causing the required drive to be effective, there is a coiled spring 51 that is attached at one end thereof to a pair of supporting arms 52 that carry the above indicated gear train. The other end of the spring 51 is attached to a supporting block 53 that is centrally located within the body of tool 11, and is rigidly connected by any suitable means to the interior of the upper portion of tool 11. In addition, another spring 54 is attached to supporting block 53 which extends in the opposite manner from spring 51 to apply similar spring pressure against another pair of arms 55. Arms 55, in turn, support a pair of spiked wheels 56 which are free rotating and merely act, together with their supports as balancing or centralizing means for the driving mechanism.

Both the gear train supporting arms 52 and the dummy wheel supporting arms 55 are pivotally supported at the lower ends thereof on support extensions 60 and 61 respectively. Arms 52 and 55 are radially and pivotally movable through longitudinally extending circumferentially spaced openings or windows 86 in the upper portion of the body of tool 11. These support extensions 60 and 61 are integrally attached to, and extend from an upper bearing and support 63 that carries another bearing for the upper end of the shaft 33, i.e. above the worm gear 46. This upper bearing structure may be attached for support thereof to the body of tool 11 in any convenient manner (not shown).

It will be appreciated that different mechanical arrangements may be made for driving a piston, e.g. piston 26, along the interior of the body 22 of the tool. For example it is contemplated that if desired, the piston might be provided with a threaded hole itself so that it would be directly driven along the interior of the body 22 when the drive shaft was rotated. However, such an arrangement would involve the drive shaft 33 extending along the length of body 22 where the inhibiting material is to be located. For this reason it is preferred to employ a structure in accordance with the illustrated embodiment, whereby the piston 26 is moved remotely by driving a travelling nut 31 that is attached for transmitting its movement to the piston 26.

Figure 5:
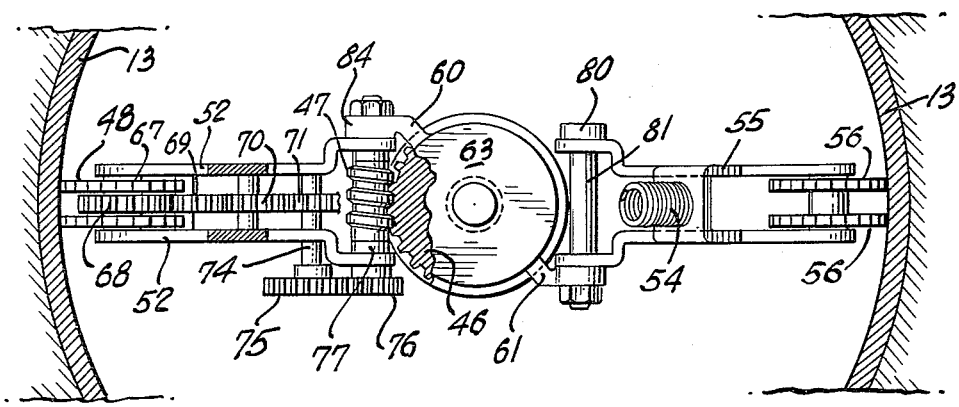
FIGURE 5 is a plan view, partly broken away in cross section, and showing the same elements as those illustrated in FIGURE 4.

Referring to FIGURES 4 and 5 the details of one mechanism for making a mechanical driving connection between friction drive wheels, e.g. wheels 48, and the drive gear for the drive shaft, is shown. Thus, it will be observed that there is a gear 68 that is attached to a same shaft 67 as that which carries the spiked wheels 48. Of course, all of these three elements, i.e. spiked wheels 48 and gear 68, are securely attached to the shaft 67 for rotation together as a unit. Gear 68 meshes with and drives another gear 69 which in turn drives a gear 70, and this in turn drives another gear 71. Gear 71 is carried on a shaft 74 and rotates the same so that another gear 75 which is also securely attached to shaft 74 for rotation therewith, will be rotated thereby. Gear 75 meshes with a pinion 76 that is securely attached to a shaft 77 that carries the worm 47. It will be observed that the worm 47 meshes with (to drive in rotation) the worm gear 46.

It may be noted that oppositely located from the gear train and its supporting structure, there is the already indicated similar pair of arms 55 which act to support the free rotating dummy wheels 56. These arms 55 are pivotally attached to the supporting arm 61 in any feasible manner, as by means of a bolt 80 and spacer sleeve 81, as illustrated. This structure is symmetrical with and similar to the support for the gear train that is carried by the arms 52 and that are in turn pivotally supported from a lug 84 at the lower end of the support arm 60.

*Operation*

The operation of the tool specifically described by way of illustrating the invention, will be clear upon inspection of the illustrations herein. However, this may be briefly reviewed as follows. The tool 11 will be lowered into the hole, within the casing 13 that is to be coated, to the desired depth therein where coating is to begin. During this lowering of the tool no action internally will take place as the drive wheels 48 will merely rotate freely. Such free rotation may be carried out in any convenient manner such as by employing a ratchet connection (not shown) or otherwise provide for free rotation of the drive wheels 48 in the direction that is caused by the lowering of the tool. Then, as a coating action is to be carried out, the tool 11 is merely raised rather slowly and the drive wheels 48 will be rotated by relative movement between the tool 11 and the casing 13. Such driving rotation will cause the drive shaft 33 to be rotated within the tool, and thus cause the piston 26 to be moved forceably downward so as to cause the inhibiting material 14 to be extruded via the holes 19 and over the surface of the spreader 18 onto the interior surfaces of the casing 13. It will be clear that this may be continued for a distance that will completely exhaust the supply of inhibiting material within the tool 11, and then the tool may be rapidly raised to the surface for a reloading and re-lowering to the depth where the last previous coating was exhausted.

It will be observed that a tool according to this invention is relatively simple and positive acting, with structure such that it will be substantially trouble-free. Also, it is to be noted that the tool is supported from a single supporting cable which need merely have sufficient strength to support the tool plus the slight additional load created by the frictional drive of the mechanism that extrudes the inhibiting material. This is a meritorious feature in that there is not needed any special structure in the supporting cable which must extend the full length of the hole involved in the coating operation. It will be appreciated that this is an important feature when it is remembered that the depths involved in oil well operations may be very substantial.

While a relatively detailed embodiment of the invention has been described above in accordance with the applicable statutes, this is not to be taken as in any way limiting the invention but merely as being descriptive thereof.

What is claimed as the invention is:

1. A down hole tool for applying a coating material to the internal walls of casing comprising a cylindrical body adapted to vertical movement in said casing, means defining a cylinder chamber in said body for containing said coating material, fluid passage means to permit said coating material to be ejected from said cylinder chamber, a seal means carried by a piston slidably and sealingly mounted in said cylinder chamber, thrust bearing means attached to said body for rotatably supporting a rotatable shaft held against axial movement and extending longitudinally in said cylindrical body, a non-rotatable nut member rigidly connected to said piston and threadedly engaged with said rotatable shaft, means for supporting said nut member for longitudinal movement only within said cylindrical body, and actuating means for rotating said shaft during upward movement of said tool in said casing in such direction that said piston moves downwardly in said cylinder chamber to eject therefrom said coating material.

2. A down hole tool according to claim 1 wherein said actuating means includes a friction means for contacting said casing.

3. A down hole tool for applying a coating material to the internal walls of casing comprising a cylindrical body adapted to vertical movement in said casing, means in said cylindrical body defining a downwardly extending cylinder chamber for containing said coating material, means defining a plurality of ports in the lower portion of said cylinder chamber to permit said coating material to be ejected from said cylinder chamber, a seal means carried by a piston slidably and sealingly mounted in said cylinder chamber, thrust bearing means attached to said body for rotatably supporting a rotatable shaft extending longitudinally in said cylindrical body and terminating above said piston, longitudinal rib members protruding transversely from the internal wall of said cylindrical body, a non-rotatable nut member threadedly engaged with said rotatable shaft and mounted for longitudinal movement along said rib members, an elongated member rigidly connecting said nut member to said piston, and actuating means for rotating said shaft during upward movement of said tool in said casing in such direction that said piston moves longitudinally downward in said cylinder chamber to eject therefrom said coating material.

4. A down hole tool according to claim 3 wherein said actuating means includes a friction means for contacting said casing.

References Cited in the file of this patent

UNITED STATES PATENTS

| | | |
|---|---|---|
| 300,941 | Billings | June 24, 1884 |
| 1,383,379 | Blain | July 5, 1921 |
| 1,601,646 | Raymond | Sept. 28, 1926 |
| 2,852,080 | Roach | Sept. 16, 1958 |